DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 278

T904,035
NOVEL CYAN-DYE-FORMING COUPLER

Samuel J. Ciurca, Jr., Kodak Park,
Rochester, N.Y. 14650

Filed June 27, 1972, Ser. No. 266,766
**Int. Cl. G03c *1/40***
U.S. Cl. 96—100
No Drawing. 33 Pages Specification

Cyan-dye-forming $\alpha$-naphtholic couplers and intermediate compounds having an alkyl ballasting group of 12 or more carbon atoms substituted on the No. 7 ring position of the B ring as in the formula

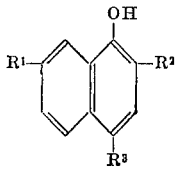

wherein $R^1$ is an alkyl group;

$R^2$ is a hydrogen atom, an amino group, an alkyl carbamyl group, an arylcarbamyl group, or a carbamyl group;

$R^3$ is a hydrogen atom, an amino group, or a coupling off group including an aryl azo and a sulfonamido group; also elements and emulsions containing one or more of the above defined couplers and a method for improving color photographic images by utilizing said couplers.